Feb. 10, 1970    G. MESSNER ET AL    3,494,837
METHOD OF TESTING PRINTED CIRCUITS
Filed Oct. 27, 1966

INVENTORS
GEORGE MESSNER
RUDOLPH J. ARMSTRONG
DIMITRY G. GRABBE
BY
Morgan, Finnegan, Durham & Pine
ATTORNEYS

United States Patent Office 3,494,837
Patented Feb. 10, 1970

3,494,837
METHOD OF TESTING PRINTED CIRCUITS
George Messner, Sea Cliff, and Rudolph John Armstrong, Hempstead, N.Y., and Dimitry G. Grabbe, Lewiston, Maine, assignors to Photocircuits Corporation, Glen Cove, N.Y., a corporation of New York
Filed Oct. 27, 1966, Ser. No. 589,963
Int. Cl. B01k 1/00
U.S. Cl. 204—1
13 Claims

ABSTRACT OF THE DISCLOSURE

A process for testing a printed circuit board is provided which comprises providing a first conductive plate and a second conductive plate, placing between said conductive plates a printed circuit board, placing between said printed circuit board and one of the conductive plates a porous sheet of paper capable of indicating color change, placing between said printed circuit board and the remaining conductive plate an overlay template which is non-conductive and which has apertures opposite selected terminals on the printed circuit board, and placing a conductive pad over said template between the template and the remaining conductive plate, applying an electrical potential across said conducting plates whereby an electric current flows from one of the conducting metal plates through the terminals on one side of the printed circuit board in contact with the conducting plate, through at least one internally connected printed circuit in the board connected to said terminals, to terminals on the other side of said circuit board which are in contact with said paper whereby there is a change in color in the paper immediately opposite the point of contact of said terminals and said paper.

---

Figure 1:
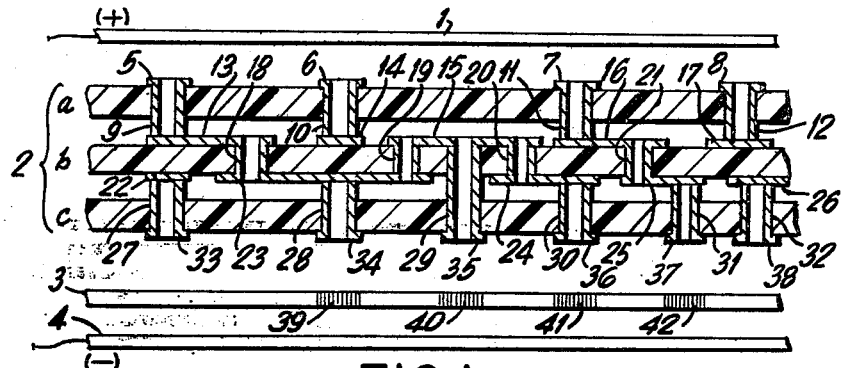

The present invention relates to a process and apparatus for testing multilayer printed circuit boards. The invention particularly relates to a method for testing printed circuit boards for continuity, for shorting between circuits, and shorting to ground or power planes. One embodiment of the process can be used for testing for shorts and for testing the insulation between circuits and the voltage at which the insulation breaks down in printed circuit boards. The invention further relates to a process which produces a visual record of the test results obtained.

More particularly, the invention relates to an electrical process for testing printed circuits whereby circuit continuity, for example, is tested by energizing selected circuits by making electrical contact with selected terminals on one side of the circuit board with an electrical conducting plate, applying a potential voltage between said plate and a second electrical conducting plate on the other side of the circuit board which is in electrical contact with other terminals. The conducting plates have sandwiched there between the printed circuit board and beneath the circuit board there is a sheet of material which contains an indicator material. The circuits that are continuous energize the terminals on the opposite side of the board. The indicator material when contacted with the energized terminals of the printed circuit board undergoes at the points of contact a distinct color change.

The potential is applied for a sufficient period of time to provide a detectable color change in the indicator material at the points of contact of the energized terminals. The applied potential is then removed and the indicator sheet removed and dried. The sheet comprises an easily readable and storeable record of the test. Depending on the indicator material sheet used, a permanent record of the test can be obtained. The dried sheet can be compared with an overlay template which has openings corresponding to a pattern of the desired continuous circuits and it can be readily ascertained if the circuits are continuous and the circuit boards acceptable.

Circuit boards containing printed circuits on one or both sides of the circuit board where the circuits are relatively simple and exposed can be easily visually checked for circuit continuity and/or can be easily electrically checked since only a small number of electrical contacts need be made to check the integrity of the circuit. A major problem, however, arises in checking printed circuit boards where the boards are coated with an insulating material which renders it difficult to see through the boards to the circuits. The problem is even more pronounced with multilayer printed circuit boards which contain three or four layers of printed circuits which are interconnected, for example, by plated through-holes where each of the boards in the multilayer have one or more circuits on each side of the board and possibly a ground plane, all of which are interconnected to other circuits in other layers in the composite multilayer boards. Complex multilayer circuit boards of this type are expensive and represent a significant economic investment in each board. It is therefore extremely important to know, prior to assembling components on the boards, that the circuit continuity is correct and all circuits are operable and that no short circuits exist.

The majority of electrical interconnections in multilayer printed circuit boards are made on internal insulating base layers. Therefore, in contrast with single sided or two-sided printed circuit boards, the integrity of such interconnections cannot be ascertained by visual inspection. The most frequent method used for testing the multilayer printed circuit boards, to insure that all required internal interconnecions beween the terminal areas located generally on the surface of the board exist, is to subject such boards to a functional electrical continuity test. This functional electrical testing procedure can also be used to test printed circuit boards which contain one or more ground and/or power distribution planes which are connected only to selected terminal areas of the board but bypass other terminal areas of the board.

The functional electrical testing procedure is usually performed by applying voltage through two probes to different terminals of internally interconnected areas and if continuity exists a suitable signal will so indicate. To direct the operator where to apply the probes some suitable visual aids or interconnection wiring lists are utilized. Another method of such electrical testing is to utilize numerically controlled machines and suitable jigs which will energize the required electrical paths in sequence and record the results. The disadvantages of both these methods are that they are either tedious and time consuming or that the programming and tooling required is very expensive. A further disadvantage is that these procedures require the need of relatively highly skilled personnel to carry out the testing. Also these procedures do not readily provide an inexpensive record of the tests carried out.

In the testing of multilayer printed circuit boards it is necessary to establish the continuity of circuits as well as the absence of connections between parts of the circuitry such as the ground planes and the logic patterns. If there is an internal short, for example, because a part of a logic pattern had inadvertently been connected to a ground plane, the existence and location of the short can be established in accordance with the present invention more readily and economically than by using the functional test procedure discussed above.

In accordance with one embodiment of the present invention a printed circuit board is tested for a circuit continuity by a process which comprises the following procedure. A sandwich made up of the following materials is prepared starting from the bottom layer. A base which consists of an insulating layer. The next layer is a conducting plate; the next layer is a porous sheet of indicator or test paper which has been impregnated with an electrolyte. The porous sheet also contains an indicator material. The electrolyte and indicator material may be the same or different materials. The paper is saturated with solvent and excess solvent is removed from the impregnated paper layer before placing it on top of the lowermost conducting plate. The circuit board to be tested is placed on top of the paper so that the bottom terminals of the circuit board are in contact with the impregnated paper.

The the terminals of the circuit that are to be tested on the top of the circuit board are suitably electrically connected to a power source, for example, by placing over the circuit board, in contact with the terminals on top of the circuit board, a conducting metal plate.

An electrical potential is applied across the conducting metal plates by contacting the top conducting plate to one terminal of a power source and the bottom conducting plate to another terminal of a power source. In this manner a potential is applied to the top conducting plate, to the terminals on the top of the printed circuit board, through the printed circuits in the board, for the circuits that are continuous, to the terminals on the bottom of the circuit board, through the porous indicator paper, to the bottom conducting plate.

The places of contact on the porous indicator paper opposite the terminals on the bottom of the circuit board of the terminals which are thus energized undergo a distinctive change in color.

In a similar manner selected circuits within a multilayer circuit board can be tested for continuity at specific circuit connections by using an overlay template and covering all but the terminals of those circuits which it is desired to have checked out.

The process can also be used for testing for shorts to a ground plane. In a simple procedure for testing for shorts, the top conducting plate can be isolated from all but selected terminals on top of the circuit board by using a suitable insulating template, as before, allowing the top conducting plate only to come into contact with a terminal connected to a selected ground plane. A potential is then applied as before and printed circuits in the board which have become connected to the ground plane by means of internal shorts produce circuit connections to one or more of the bottom terminals. This energizes the bottom terminals and at the points of contact between the energized terminals and the indicator paper, a color change in the paper occurs indicating that one or more internal circuits have shorted out to the ground plane.

A multiplayer printed circuit board containing leads or terminals on the top of the board which are connected through various circuit logic patterns to leads or terminals at the bottom of the board can be checked for continuity in accordance with the present invention. This would be an example of circuits that have terminals existing from front to back of the circuit board.

Other circuit boards which have terminals to internally connected logic circuit patterns all of which are on the top of the board may also be checked out in accordance with the present invention. The embodiment illustrated in FIG. 3 of the drawings can be used for this purpose.

Circuit boards having circuits on one or both sides as well as multilayer circuit boards having three or four circuit boards with circuits on either or both sides and/or ground planes can be checked out in accordance with the present invention.

In another embodiment of this invention the circuit board by proper programming, i.e. using a specific overlay template or templates, can be checked for shorts between logic patterns. In this embodiment the overlay template is made to have holes opposite terminals which are not supposed to be connected through internal printed circuits to terminals on the bottom of the board. The board is tested as before and if there are no short circuits there will be no color change opposite the terminals on the bottom of the board.

If it is desired to test the board for the voltage at which the insulation breaks down between logic patterns using the above described procedure, all that is required is to increase the voltage potential across the conducting metal plates until a color indication is obtained and note the voltage at which this occurs.

In accordance with one embodiment of the present invention an electrolytic means of testing the printed circuits is used. In this method when the potential is applied and the circuits to be tested energized, a very small amount of the metal terminal in contact with the test paper is caused to deplate from the terminal and go into the electrolyte impregnated test paper and/or to deplate from the terminal and go into solution in the electrolyte impregnated test paper. In the case where the electrolyte and deplated metal do not give a color change, the test paper also contains a color indicator material. The deplated metal causes a drastic change in the color of the test paper at the points in the paper immediately opposite the energized terminals.

In accordance with another embodiment of the present invention an electrosensitive paper is used. This paper is also impregnated with an electrolyte and contains a color indicator material. In this method when the potential is applied and the circuits to be tested energized there is no deplating of the metal from the terminals. The change in color that is obtained in the test paper appears to be due to the passage of a small amount of electrical current through the test paper at the points in the test paper immediately opposite the energized terminals. The mere passage of a small amount of electrical current through the test paper causes the indicator material to drastically change color.

Generally the various circuit patterns of different layers of the multilayer circuit board are connected by plated through-holes, though other means can be used.

The plated through-holes are connecting means between the printed circuits on different layers. The leads or terminals can be made of copper or can be copper coated with nickel and/or coated with a protective mask. The various masks are added to the terminals to form a protective coating and/or to facilitate soldering leads to the terminals. Depending on the coating on the terminal which is to be tested, the indicator means in the electrolyte impregnated paper will be selected so that it changes color when the terminal is energized. That is to say, different indicators may be used to obtain optimum results with different metal terminals.

A suitable electrolyte is selected for a particular system being used. The electrolyte is used in sufficient concentration to provide a small current to pass through the electrolyte impregnated paper. The resistivity of the impregnated paper should be sufficient to prevent shorting between the terminals and the metal conducting plate.

In one embodiment for use with the electrolytic procedure the indicators which are dispersed within the electrolyte impregnated paper are selected to give a rapid change in color on contact with the deplated metal of the terminal on energizing the system. The color change is at the points on the paper immediately opposite the energized terminals.

In another embodiment of the invention used with the electrosensitive paper procedure the indicator material is dispersed throughout the electrolyte impregnated paper and changes color on the passage of current through the paper at the points on the paper immediately opposite the terminals being tested. The test paper used can be any of the electrosensitive papers used with conventional electrosensitive paper recording instruments.

The process of this invention solves the time-consuming, tedious effort normally required to test out individual circuits of multilayer printed circuit boards either by hand or the expense incurred in tooling up and manufacturing jigs which are digitally controlled to test specific circuit boards. In addition, the present invention provides a permanent easily storeable record of the tests carried out on a particular circuit board.

The invention may be better understood by reference to the drawings.

FIG. 1 is a schematic representation in cross section of a simple arrangement of a multilayer printed circuit board showing the source of electricity and the polarity of conducting metal plates at the top and bottom of the circuit board and showing immediately below the circuit board an electrolyte impregnated paper containing an indicator material. The printed circuit board of FIG. 1 contains terminals at the top of the circuit board, said terminals being connected through logic circuit patterns on intermediate layers in the printed circuit board to terminals in the bottom of the board.

Figure 2:
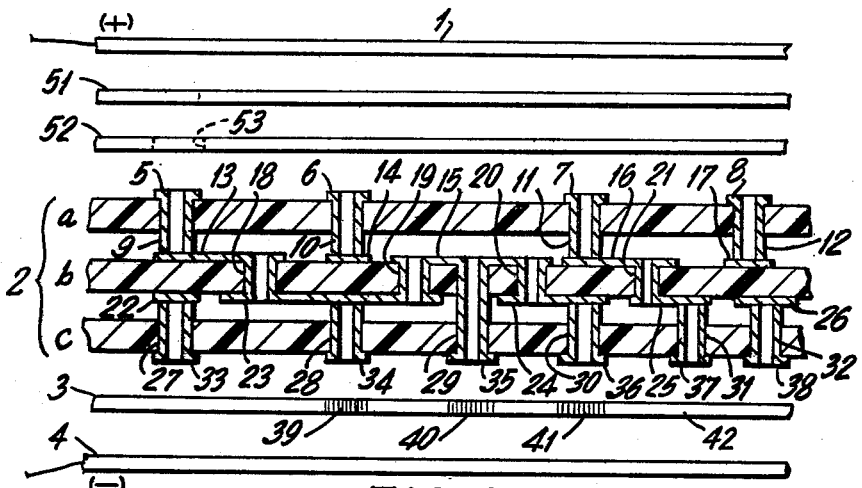

FIG. 2 of the drawings is a schematic representation in cross section of the same circuit board as in FIG. 1 but which is set up to check a selected circuit by interdisposing between the printed circuit board and the top conducting metal plate a nonconductive template having a hole cut above a particular terminal at the top of the circuit board. The drawing also shows a conductive pad which, when pressure is applied, provides good electrical contact through the hole in the template to the terminal desired to be tested.

Figure 3:
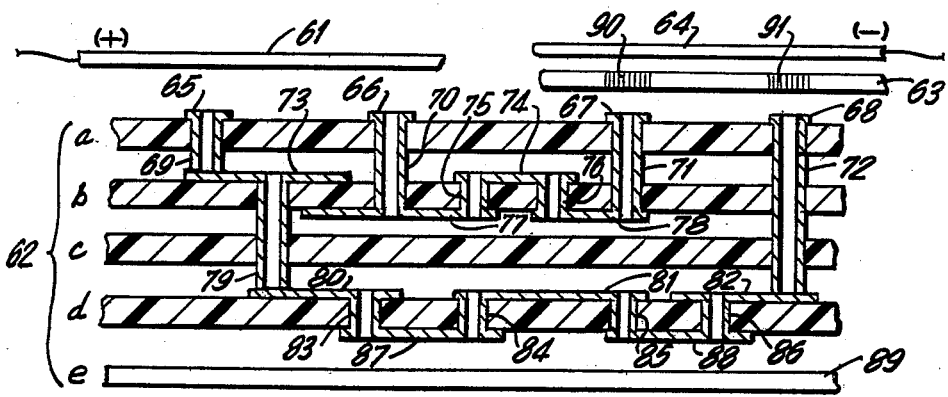

FIG. 3 of the drawings is a schematic representation in cross section of a multilayer printed circuit board which has connecting logic circuits in the board between terminals on one side of the board and terminals on the other side of the board. Both sets of terminals are on the top of the circuit board. In order to test this particular circuit board, a conducting plate of one polarity is contacted with terminals on one side of the board and is kept out of electrical contact with the conducting plate of the opposite polarity which contacts the terminals on the other side of the printed circuit board. The electrolyte impregnated indicator paper can be placed between the second conducting plate and the terminals to be checked on the other side of the board.

The drawings will be discussed in greater detail below when describing specific examples of the present invention.

The terminals of the printed circuit boards which are being tested can be copper, nickel, nickel coated copper and nickel or copper coated with a protective mask. Suitable protective masks are tin, lead, tin-lead solder, and nobel metals such as gold.

The electrolyte used to impregnate the test paper is water soluble. Suitable electrolytes are bases such as sodium hydroxide, acids such as hydrochloric acid and acetic acid, salts of bases and acids, such as alkali and alkaline earth metal salts of hydrochloric, nitric, sulfuric and chromic acids. Specific electrolytes that can be used are potassium nitrate, potassium sulfate, copper sulfate, sodium nitrate, sodium sulfate, sodium chloride, nickel chromate, lead nitrate, etc. Any electrolyte which is compatible with the color indicator can be used.

The concentration of electrolyte in the impregnated paper is generally relatively high and is selected so that during the testing the electrolyte remains in solution. This concentration can vary between about 1 and 50% by weight of dry paper, depending on the amount of water present and the solubility of the electrolyte. Solvents other than water, e.g. alcohols, can also be used.

The concentration of the color indicator material, where it is other than the electrolyte used, is sufficient to obtain a sharp change in color to provide a sharp image of the terminal areas in contact with the indicator paper. The particular color indicator used will depend on whether the electrolytic or electrosensitive embodiment of the invention is used.

The porous indicator paper is saturated with an aqueous solution containing the electrolyte. Prior to carrying out the test, however, the excess moisture is removed while still maintaining sufficient moisture in the impregnated paper to maintain the electrolyte and where applicable the color indicator material in solution. Generally the amount of moisture present is not critical except to the extent that runoff should be avoided. The moisture content can be between 20 and 150% by weight based on weight of dry paper, but is preferably between 30 and 100% by weight based on weight of dry paper.

The voltage applied across the conducting metal plates containing between them the multilayer printed circuit board will vary with the resistivity of the circuits to be checked, the resistivity of the test paper, the particular indicator means, and the electrolyte in the impregnated paper being used to record the test of the circuit. The voltage is adjusted so that the desired indication of color change in the impregnated paper is obtained but is not sufficiently high to short circuit through the electrolyte in the indicator paper. Voltages between $1 \times 10^{-3}$ and 40 volts can be used, voltages between about 1 and 30 volts can also be used, but preferably voltages between 5 and 15 volts are used.

The current actually utilized in carrying out the test is negligible, though there is in some cases an initial high current rating, this current usually rapidly drops off as the electrolyte in the impregnated paper becomes ionized. Currents in the range of $1 \times 10^{-3}$ to 20 amps can be used, currents between $1 \times 10^{-2}$ and 10 amps can also be used, but currents between about $1 \times 10^{-1}$ to 10 amps are preferred. The actual amperage noted will, of course, depend on the number of terminals being tested. The more terminals energized the higher the current.

The power is turned on and the selected circuits energized. The time required to obtain suitable test results and to obtain a good color indication in the test paper will vary with the metal of the terminals in contact with the test paper, the electrolyte in the test paper, the indicator material used and the voltage applied. The time can be between 1 and 60 seconds, the time can also be between 3 and 45 seconds.

The pressure applied in bringing the conducting plates, the test paper and the printed circuit to be tested together is not critical except that it should be sufficient to obtain good electrical contact between the materials between the conducting metal plates. Normally pressure between 5 to 10 lbs. per sq. in. is sufficient in testing single layer or multilayer boards.

Where a relatively complex multilayer printed circuit board is to be tested and it is desired to test only selected circuits within the board, one or more insulating templates can be used. The template is nonconductive of electric current. Predesignated areas in the template are cut out to expose the desired terminals of the circuit board that are to be contacted with the paper source and energized. The template can be used at the top of the printed circuit board and the bottom of the board can be maintained in direct contact with the electrolyte impregnated test paper. In order to obtain good electrical contact through such a template there is normally employed a conductive pad between the template and the conductive plate on top of the printed circuit board being tested. Suitable conducting pads are graphite impregnated felt pads or finely woven steel wool. The conducting pads, when pressure is applied, bridge the distance of the thickness of the template through the hole cut in the template and assure good electrical contact between the uppermost conducting plate and the terminals of the multilayer printed circuit board which are to be energized.

The temperature at which a test is carried out is normally ambient temperature; however, a higher or lower temperature can be used with specific color indicators.

An easy check of the test carried out is to use an overlay template having holes where the electrolyte impregnated paper should have indicated a color change. In this manner one can quickly see those terminals which have a color change and those which do not and can either approve or reject a particular multilayer printed circuit board.

The electrolytic test procedure carried out in accordance with one embodiment of the present invention depends on the deplating of the metal terminals of the printed circuit board being tested. When the power is turned on and the voltage applied across the conducting metal plates and the terminals energized, an infinitisimally small amount of the metal on the energized terminals deplates and goes into the test paper. The amount of deplating is minimal and has no effect on the quality of the circuit board. The deplated metal can go into the test paper as a fine dispersion of the elemental metal which changes the color of the test paper, can go into solution in the electrolyte and form a highly colored compound, in solution, with the electrolyte, can form a highly colored precipitate with the electrolyte, can go into solution and form a highly colored compound in solution, with the color indicator material, can form a highly colored precipitate with the color indicator; can go into solution and be oxidized or reduced and form a highly colored material with either the electrolyte and/or the color indicator.

Normally the terminal in contact with the test paper will be an anode, but this may change depending on the metal of the terminal, the electrolyte used and/or the color indicator material used.

The electrolyte can, as stated above, also function as the color indicator material. Where the electrolyte comprises sulfate ions and the metal of the terminal is, for example, copper, the deplated copper forms in the electrolyte impregnated test paper a bright blue colored hydrated copper sulfate. Where the electrolyte comprises the nitrate ion and the metal of the terminal is nickel, the deplated nickel forms a green colored nickel nitrate. Where a lead tin solder mask is used over a copper terminal and the electrolyte comprises nitrate ion, a black lead compound is formed in the indicator paper.

The electrolyte impregnated paper can also contain specific color indicator materials which on contact with a selected deplated metal will form a highly colored compound, complex compound, and/or dye. For example, a color indicator material which forms a highly colored complex with a lead-tin solder mask is sodium rhodizonate which forms a blue colored lead-tin rhodizonate complex.

In the electrolyte test procedure, as in the electro-sensitive test procedure, current passes through the electrolyte impregnated test paper.

Suitable conditions for carrying out the electrolytic test procedure are 5 to 15 volts, an initial current indication 1 to 8 amps, which rapidly drops off, and 15 to 45 seconds. The actual test conditions will of course depend on the metal of the terminal of the printed circuit board being tested, the number of terminals being tested, the electrolyte and concentration used, and where applicable the indicator material and concentration used.

The electrosensitive paper test procedure carried out in accordance with another embodiment of the present invention also depends on the passage of an electric current through the electrosensitive paper. This procedure differs from the electrolytic procedure in that there is no apparent deplating of the metal terminals of the printed circuit board. Also, the test procedure generally takes less time, is carried out at a lower voltage, and less current passes through the paper.

In accordance with this embodiment of the invention, any of the electrosensitive papers used with conventional electrosensitive recording equipment can be used. Suitable test papers are starch iodine recording paper, Catechol recording paper, the Alfax A and A2 recording papers, and the like. However, any electrolyte impregnated paper containing a color indicating material, which on the passage of an electric current through the test paper causes a change in color in the paper, can be used. For example, papers containing relatively colorless compounds, which on passage of current through the paper are oxidized and/or reduced to a higher or lower state of oxidation which later state forms a highly colored compound or precipitate, can be used. The demands for a color indicator test paper are generally less severe than for a recording paper and many materials which may not be suitable as a recording paper can be used.

The electrosensitive paper procedure utilizes relatively low voltages, for example, of less than 1 volt to about 12 volts and low currents from about $1 \times 10^{-3}$ amp to about 8 amps and very quickly changes color, taking only 2 to 40 seconds. The preferred conditions, however, are 5 to 15 volts, about $1 \times 10^{-1}$ to 4 amps and 5 to 20 seconds. The exact conditions, however, will depend on the concentration of electrolyte, e.g. 10 to 30% by weight based on weight of dry paper, the amount of water, e.g. 50 to 100% by weight based on weight of dry paper, and the particular electrolyte and indicator material used. The amount of indicator can be 1–10% by weight. Also to be taken into consideration is the metal of the terminal in contact with the test paper. In some tests darker color indications are obtained by utilizing a voltage potential for a short time and then reversing the polarity for a short time.

The invention is better understood with reference to the following examples. The examples describe representative processes utilizing the method of this invention and are given as illustrations of the invention only and are not to be interpreted to limit the scope of the invention.

The process of the present invention will further be discussed with reference to the drawings.

EXAMPLE 1

In FIG. 1 of the drawing layers 2a–c comprise an expanded view of a multilayer printed circuit board. Layer 2b contains printed circuits 13, 14, 15, 16 and 17 on the top of an intermediate insulating board 2b. The board 2b also contains printed circuits on the bottom side which are indicated by 22, 23, 24, 25 and 26. Connections between the circuits on the top and the bottom of board 2b are made by plated through-holes 18, 19, 20 and 21. The printed circuit board 2b is covered at the top surface by an insulating board 2a and at the bottom surface by insulating board 2c. Connections between various circuits of the board 2b through board 2a to terminals on board 2a are made by plated through-holes 9, 10, 11 and 12, which terminate in terminals 5, 6, 7 and 8 respectively. The printed circuits on board 2b communicate with the terminals 33, 34, 35, 36, 37 and 38 at the bottom of board 2c through plated through-holes 27, 28, 29, 30, 31 and 32 respectively.

It will be realized of course that FIG. 1 is an expanded view of the multilayer board and the actual thickness of the board is a fraction of an inch, in some cases as little as 1/32 to 1/8 of an inch. Note that printed circuit 22 communicates with terminal 33 but does not communicate with the top of the board. Also, printed circuit 26 communicates with the bottom of the board at terminal 38 and is not electrically connected to the top of the board. In similar manner circuit 14 communicates with terminal 6 and circuit 17 communicates with terminal 8 and neither are electrically connected to the bottom of the board.

In testing this circuit board for continuity, the continuity of the printed circuits which have electrical connections between terminals at the top of the board and terminals at the bottom of the board through interconnected internal printed circuits can be checked by contacting the top of the board with conducting plate 1, which is attached to a suitable power source and the bottom of the board with an electrolyte impregnated paper layer 3 and the conducting plate 4. Plate 4 also communicates with a suitable power source.

A suitable test paper that can be used with the electrolytic test procedure is one which is densely packed with the majority of fibers oriented perpendicular to the surfaces of the paper such as, for example, Watman Paper #4. A local color change which occurs during the test will then have little tendency to spread and a sharp image or area of color change will be obtained.

Potential voltage is applied to plates 1 and 4 across the printed circuit board 2. Only those terminals at the bottom of the board which have electrical connections through intermediate printed circuit patterns with the terminals on the top of the board are energized. Therefore when the power is applied terminals 33 and 38 are not energized since they have no direct electrical connection with terminals at the top of the board. But terminals 34, 35, 36 and 37 are energized and the area immediately opposite these terminals in the porous sheet drastically changes color forming discolorized areas 39, 40, 41 and 42 in the porous sheet 3.

The terminals in this example are copper. The electrolyte used in the impregnated paper 3 contains 5%, by weight based on weight of dry paper, in solution of potassium nitrate and 5%, by weight based on weight of dry paper, in solution of sodium sulfate. The discolored areas of 39, 40, 41 and 42 are dark blue. These areas are the areas where the copper from the energized terminals deplated and went into solution and formed the dark blue color of hydrated copper sulfate. In this example the electrolyte is also used as the color indicator material. The change in color in the test paper opposite all of the terminals 39, 40, 41 and 42 indicates that all of the internal printed circuit patterns are continuous and that there are no breaks in the circuit patterns.

In Example 1 the total thickness of the multilayer printed circuit board is 1/32 of an inch. The electrolyte impregnated paper is .007 of an inch thickness and saturated with the aqueous electrolyte solution which is also the indicator material. The test paper contains 30-100% water based on weight of dry paper. A voltage of 8 volts is applied for a period of 12-20 seconds and a small amount of current, e.g. initially 1-5 amps but drops off, passes from the upper plate 1 through the printed circuits, through the electrolyte impregnated test paper to the lower plate 4 and then the power is turned off and the indicator paper containing the test results is removed and dried as a permanent record. The change in color obtained requires only a very small amount of copper to deplate. The amount of copper that deplates is not enough to affect the quality of the printed circuit boards.

EXAMPLE 2

With reference to FIG. 2 of the drawings, a printed circuit board of the same configuration as FIG. 1 is tested, wherein the identified portions of the drawing are the same as in FIG. 1. In this test, however, an overlay template 52 is used which has a hole 53 opposite terminal 5 so that only terminal 5 is brought into contact with the power source. In order to obtain good contact a graphite impregnated felt pad 51 is placed between the template and the conducting metal plate 1 so that when pressure is applied, good electrical contact between plate 1, through the felt pad 51, through the hole 53 in the template to terminal 5, is obtained. The other terminals which are contacted in Example 1, for example, terminal 7 is blanked off by the template and the printed circuits connected to terminal 7 are not tested. Terminals on this printed circuit board 5, 6, 7 and 8 on the top and 33, 34, 35, 36, 37 and 38 on the bottom of the board had been previously coated with a thin gold mask in order to facilitate soldering suitable leads to the terminals.

A porous sheet 3 is about .010 inch thick and is saturated with an electrolyte solution of $KNO_3$. About 5 to 10% by weight based on dry weight of paper of $KNO_3$ is used. The water content of the paper is 40 to 80% water based on the dry weight of the test paper. As in Example 1 when the power is turned on a small amount of the gold mask from the energized terminals, i.e. 39, 40 and 41, deplates and goes into the electrolyte impregnated paper. The gold, however, in this example, forms in the paper what appears to be a colloidal dispersion of elemental gold and has a violet color.

Conducting metal plates 1 and 4 are brought together under pressure as before so as to provide intimate contact between the layers between the two plates. A voltage of about 12 volts is applied for a period of 8-20 seconds and a small amount of current flows through the circuit being tested. The power is turned off and the pressure is released. The porous sheet 3 containing the electrolyte and dispersed gold indicator material is found to be discolorized at positions 39, 40 and 41 opposite terminals 34 and 35 and 36 of the circuit board indicating that the internally connected circuits are continuous. The violet color may be intensified by heating and drying the test paper.

It is noted that terminal 37 which was activated in Example 1 and caused the porous sheet to decolorize in an area 42 immediately opposite the terminal did not decolorize the sheet in this example because terminal 7 with which it connects at the top of the board was blanked off from the power source by nonconducting template 52. By following the procedure of this example, testing of selected circuits can be programmed merely by preparing a suitable overlay template.

EXAMPLE 3

Referring to FIG. 3 of the drawings it is seen that the various components of the multilayer printed circuit board are generally the same as the components described above with relation to FIG. 1 of the drawings though for purposes of clarity are numbered differently. Terminal 66 on the top of one side of the board communicates through three printed circuits, two 77 and 78 on the bottom of intermediate layer 62b and one 74 on the top of intermediate layer 62b through terminal 67 to the top of the other side of the board. Also, terminal 65 communicates through internally connected printed circuits, one 73 on the top of 62b and three 80, 81 and 82 on the top and two 87 and 88 on the bottom of board 62d to terminal 68 on the top and on the other side of the printed circuit board. Where the terminals of a particular printed circuit board to be tested are all on the top of the board, to test for continuity of the internal circuits, means must be provided to contact the conducting metal plates 61 and 64, of different potentials, to different areas of the boards so that the selected terminals can be tested for continuity of the circuits within the boards. In this manner conducting plate 61 is placed over the terminals to be tested, namely, 65 and 66, and separated from conducting plate 64 which is then placed over terminals 67 and 68. Interdisposed between conducting plate 64 and terminals 67 and 68 is the electrolyte impregnated pad or porous sheet 63.

In this example an electrolyte as well as an indicator material are used. The terminals 67 and 68 in this example consist of copper. The color indicator material dispersed in pad 63 comprises in solution the tetrasodium salt of ethylenediaminetetraacetate which forms a highly colored blue copper ethylenediaminetetraacetate complex.

The test paper contains, based on weight of dry paper, 25% by weight of tetrasodium ethylenediaminetetraacetate, as the indicator, 10% by weight of NaCl as the electrolyte, and 40 to 80% by weight water. A voltage of about 10 volts is applied across conducting plates 61 and 64 for about 30 seconds and a small electric current is established, for a short time and drops off, between conducting plate 61 through terminals 65, 66, the internal circuits and terminals 67 and 68 and conducting plate 64. The copper at the energized terminals 67 and 68 deplates and goes into solution and provides a small concentration of copper ions in the electrolyte impregnated porous sheet 5. Sheet 5 is between .005 and .015 inch thick. The deplated copper forms the highly colored deep blue copper ethylenediaminetetraacetate complex at positions 90 and 91 in pad 63, indicating that the internal circuits are continuous.

The pressure is removed and porous sheet 5 contains highly deep blue colored areas immediately opposite terminals 67 and 68. The porous pad is dried and retained as a permanent record of the test. The layer 89 is an insulating layer which forms the bottom of the multilayer printed circuit board and there are no connections through this layer.

EXAMPLE 4

This example is carried out in a similar manner to the procedure described in Example 1. In this example, however, referring to FIG. 1 of the drawings, a graphite impregnated felt pad about ⅛ inch thick is placed between conducting plate 1 and the top of the circuit board 2a so as to provide good electrical contact between the terminals 5, 6, 7 and 8 and conducting plate 1. The terminals in this example are coated with a protective lead-solder mask.

The electrolytic test procedure is used and the electrolyte impregnated test paper 3 contains as the electrolyte 20% by weight $KNO_3$ based on weight of dry test paper and as the indicator material 1% by weight of sodium rhodizonate based on weight of dry paper. The paper is about .010 inch thick and contains about 40 to 80% by weight water based on dry weight of the paper.

The power is turned on and a potential of 10–12 volts applied across conducting plates 1 and 4 for about 20 to 30 seconds. A small current passes through the electrolyte impregnated test paper at the points terminals 34, 35, 36 and 37 are in contact with the test paper.

A small amount of the lead-solder mask deplates and goes into solution in the electrolyte in the test paper. The lead and tin cations combine with the color indicator to form the blue color of the lead-tin rhodizonate complexes.

After the power is turned off, color indications at points 39, 40, 41 and 42 immediately opposite terminals 34, 35, 36 and 37 indicate that the internally connected printed circuits are continuous through the circuit board to terminals 5 and 7 on the top of the board. The terminals 33 and 38 have no internal connections to the terminals on the top of the board and there is no color change opposite these terminals.

EXAMPLE 5

This example was carried out using a procedure similar to that described in Example 1. In this example, as in Example 4, a graphite impregnated felt pad was placed between conducting plate 1 and the top of printed circuit board 2a to improve electrical contact between conducting plate 1 and the terminals 5, 6, 7 and 8.

This test procedure, however, uses the electrosensitive paper test procedure, i.e. an electrosensitive test paper is used and there is no apparent deplating of the metal from the terminals being tested.

The electrosensitive test paper contains as the electrolyte 10% by weight of sodium acetate and as the indicator material 7% by weight ferrous ammonium sulfate, all based on the weight of the dry indicator paper. About 5% by weight of the disodium salt of ethylenediaminetetraacetic acid is added as a complexing agent for ferrous iron. The indicator paper is about .007 inch thick and is saturated with about 100% by weight water based on weight of dry paper and has a pH of about 4.6.

The terminals 33, 34, 35, 36, 37 and 38 are of copper. The power is turned on and a potential of about 8–9 volts is applied across conducting plates 1 and 4 for about 15–20 seconds with the terminals having a plus polarity. The polarity is then reversed and the power applied for about 10 seconds. A current of about less than 1 amp passes through the test paper to plate 4 at the points the test paper is in contact with terminals 34, 35, 36 and 37. Though an initial color change is observed, reversing the polarity causes the color to appreciably darken. The passage of even a very small amount of current causes a reaction to take place in the indicator paper at the points 39, 40, 41 and 42 immediately opposite terminals 34, 35, 36 and 37 causing a drastic change in the color of the paper. It is believed that the color change is due solely to the oxidation of the ferrous ion to ferric ion and the precipitation of dark brown ferric hydroxide.

The terminals being tested initially act as the anode and on the reversing the polarity as the cathode. There is no apparent deplating of copper from the terminals as normally occurs in the electrolytic procedure.

EXAMPLE 6

In this example the procedure carried out in Example 2 was generally followed with two exceptions: the printed circuit board was tested for shorting between specific circuits and the electrosensitive test procedure was used. The example will be discussed with reference to FIG. 2 of the drawings.

In this example as in Example 2, the terminals 33, 34, 35, 36, 37 and 38 are covered with a protective gold mask. The electrosensitive test paper is substituted for the electrolytic test paper 3 previously described. The electrosensitive test paper is .030 inch thick and contains as the electrolyte 15% by weight of KCl and 15% by weight of NaCl and as the indicator material 2% by weight ferrous nitrite all based on weight of dry paper. The paper contains as a complexing agent for the ferrous ion about 10% by weight of the disodium salt of ethylenediaminetetraacetic acid. The paper also contains 60–70% by weight water based on dry weight of paper.

This test is programmed to test for a short circuit between circuits 13 and 22, 16 and 17, and continuity of circuits 13 and 23.

This is done by preparing an overlay template similar to 52 which has an opening only opposite terminals 5 and 8. A second overlay template is placed between board 2c and electrosensitive test paper 3. This second template has openings only opposite terminals 33, 34 and 37. A conducting graphite impregnated felt pad ⅛ inch thick is placed between the template 52 and conducting plate 1.

The power is turned on and a potential of 10–12 volts is applied across conducting plates 1 and 4 for about 15–20 seconds. A small current passes through the circuit board being tested, though the current indication rapidly drops off.

After the test it is found that there is only a color change indication opposite terminal 34 and no color change opposite terminals 33 and 37.

The area of color changed is examined and it appears as in Example 5 that the dark brown color of ferric hydroxide constitutes the color in the area 39 opposite terminal 34.

The color indication does not appear to contain any deplate gold ions and/or dispersed elemental gold as distinguished from the electrolytic test procedure described in Example 2 above.

This test indicates that there are no short circuits between circuits 13 and 22 or between 17 and 16 and that circuits 13 and 23 are continuous.

In carrying out the electrosensitive test procedure using a gold mask, it has been found that best results are obtained by following a sequence of reversing the polarity of the conducting metal plates. With some gold masks best results are obtained by starting with minus, changing to plus, then back to minus. With others reversing the sequence gives the best results. This difference, it is believed, depends on the process used to make the gold, e.g. acid or cyanide process.

In a procedure similar to this any one or more specific circuits can be tested for continuity, shorting between circuits, shorting to ground or power planes and connections to ground or power planes.

EXAMPLE 7

In this example the electrosensitive test procedure described in Example 5 is used, with the exception that the terminals to be tested are coated with nickel.

An electrosensitive test paper of the same type used in Example 5 is used.

Terminals 33, 34, 35, 36, 37 and 38 are coated with nickel and function as anodes during the test. The power is turned on and a potential of 8–12 volts is applied across conducting plates 1 and 4 for 15–30 seconds and a small current is noted and rapidly drops off.

In the circuits that are continuous through internally connected printed circuit logic patterns from the top of the board to the bottom of the board energize the terminals on the bottom of the board, i.e. terminals 39, 40, 41 and 42. The areas immediately opposite these terminals undergo a drastic color change indicating that the internal circuits are continuous. There is no apparent deplating of the nickel terminals into the electrolyte impregnated electrosensitive paper and the color indication in the indicator paper appears to be solely due to the passage of electric current through the paper.

The color indication as before appears to be the characteristic brown color of ferric hydroxide.

In accordance with the process of this invention any type or size of multilayer printed circuit board can be easily and efficiently tested for its electrical integrity with a minimum of time and expense. The programming of the tests to be carried out is provided by using one or more suitable thin dielectric templates with apertures opposite selected terminals to be tested and continuity of the circuits tested can be readily checked by using overlay templates with apertures corresponding to areas which should be colored if the circuit boards contain all the desired completed circuits.

The indicator materials, the test procedure, the electrolytes, color indicators, concentrations of electrolytes and concentration of color indicators can be varied within the scope of the present invention by one skilled in the art to obtain optimum results with a particular test and test procedure. In a similar manner the voltage applied, the time of the test and the current passed can be varied to obtain optimum test results.

The polarity of the terminals in contact with the electrolyte impregnated test paper will generally be plus (+) i.e. the anode and direct current will normally be used. However, in some cases good results may be obtained by using the terminals as a cathode, i.e. minus (−). Which procedure is best will depend on the electrolyte impregnated in the test paper, the color indicator material used, and the metal of the terminal being tested.

Also in some cases AC as well as DC current may be used to carry out the test. This will depend to a large extent on whether the color change caused in the indicator paper is caused by a reaction that is reversable or not.

A color indicator material that can be used with the electrolytic procedure is the ferrocyanide ion which forms a red brown cupric ferrocyanide complex with the copper ions deplated from the copper terminals being tested.

The process of this invention greatly reduces the amount of time and skill required by operating personnel to test multilayer printed circuit boards.

The examples are given merely as illustrative. The scope of the invention should only be interpreted in light of the appended claims. Variations and combinations which would occur to one skilled in the art are intended to be covered.

What is claimed is:

1. A process for testing a printed circuit board which comprises providing a first conductive plate and a second conductive plate, placing between said conductive plates a printed circuit board, placing between said printed circuit board and one of the conductive plates a porous sheet of paper capable of indicating color change, placing between said printed circuit board and the remaining conductive plate an overlay template which is non-conductive and which has apertures opposite selected terminals on the printed circuit board, and placing a conductive pad over said template between the template and the remaining conductive plate, applying an electrical potential across said conducting plates whereby an electric current flows from one of the conducting metal plates through the terminals on one side of the printed circuit board in contact with the conducting plate, through at least one internally connected printed circuit in the board connected to said terminals, to terminals on the other side of said circuit board which are in contact with said paper causing a change in color in the paper immediately opposite the point of contact of said terminals and said paper.

2. The process of claim 1 wherein the printed circuit is tested for shorts between at least one of the following: two or more circuits, circuits and ground planes, and circuits and power planes.

3. The process of claim 1 wherein said paper is impregnated with an electrolyte and the terminals in contact with said impregnated paper deplate and provide metal cations in the electrolyte and cause a sharp change in color of the paper immediately opposite the points of contact.

4. The process of claim 1 wherein said paper is impregnated with an electrolyte and also contains dispersed therein an indicator material and wherein the terminals in contact with said paper deplate and provide metal cations in the electrolyte and act with said indicator material in said electrolyte impregnated paper to cause a sharp change in color of the paper immediately opposite the points of contact.

5. The process of claim 1 wherein said paper is impregnated with an electrolyte and also contains dispersed therein an indicator material and wherein the terminals in contact with said indicator paper act as a conductor to pass electric current through said paper and the passage of the electric current through said electrolyte impregnated paper causes a change in the indicator material dispersed in said paper resulting in a sharp change in color of the paper immediately opposite the points of contact.

6. An electrolytic process for testing printed circuit boards for circuit integrity and continuity which comprises providing a first conductive plate and a second conductive plate, placing between said conductive plates a printed circuit board, placing between said printed circuit board and one of the conductive plates a porous sheet of paper capable of indicating color change, placing between said printed circuit board and the remaining conductive plate an overlay template which is non-conductive and which has apertures opposite selected terminals on the printed circuit board, and placing a conductive pad over said template between the template and the remaining conductive plate, applying an electrical potential across said conducting plates whereby an electric current flows from one of the conducting metal plates through the terminals on one side of the board, in contact with the conducting plate, through at least one internally connected printed circuit in the board connected to said terminal, to terminals on the other side of said circuit board which are in contact with said electrolyte impregnated paper whereby a small amount of the metal of the terminal deplates and there is a change in the color in the indicator paper immediately opposite the point of contact of said terminal and said electrolyte impregnated paper.

7. The process of claim 6 wherein the color change is caused by the deplated metal forming a colored material with said electrolyte.

8. The process of claim 6 wherein said electrolyte impregnated paper contains dispersed as the color indicator a colored dispersion of said deplated metal from said terminal.

9. The process of claim 6 wherein the color change is caused by the formation of a colored material comprising the deplated metal of said terminal and the color indicator material.

10. An electrosensitive paper test procedure for testing a printed circuit board for circuit integrity and continuity which comprises providing a first conductive plate and a second conductive plate, placing between said conductive plates a printed circuit board, placing between said printed circuit board and one of the conductive plates a porous sheet of paper capable of indicating color change, placing between said printed circuit board and the remaining conductive plate an overlay template which is non-conductive and which has apertures opposite selected terminals on the printed circuit board, and placing a conductive pad over said template between the template and the remaining conductive plate, applying an electrical potential across said conducting plates whereby an electric current flows from one of the conducting metal plates through the terminals on one side of the board, in contact with the conducting plate, through at least one internally connected printed circuit in the board connected to said terminal to terminals on the other side of said circuit board which are in contact with said impregnated paper whereby said terminals in contact with said paper act as a conductor and there is a small amount of current passing through said paper and the passage of the electric current through said electrolyte impregnated paper causes a color change in the indicator material dispersed in said paper at the points immediately opposite the points of contact of the terminals and the paper.

11. The process of claim 10 wherein the terminals on the printed circuit board initially act as anodes, the polarity is changed, and they act as cathodes.

12. The process of claim 10 wherein the terminals on the printed circuit board initially act as cathodes, the polarity is changed, and they act as anodes.

13. A process for testing multilayer printed circuit boards for internal short circuits which comprises placing said circuit board into contact with an electrolyte impregnated porous sheet of paper, placing both the circuit board and the impregnated paper between two conducting plates, placing above said printed circuit board an insulating overlay template containing openings only opposite terminals which are not connected by internal printed circuits to terminals on the other side of the printed circuit board, placing over said template, between the template and one of said conducting plates, a conducting pad, applying an electrical potential across said conducting plates whereby an electric current flows from one of the conducting metal plates through the terminals on one side of the printed circuit board in contact with the conducting plate, through at least one internally shorted printed circuit in the board connected to said terminals, to terminals on the other side of said circuit board which are in contact with said electrolyte impregnated paper whereby there is a change in color immediately opposite the point of contact of said terminals and said electrolyte impregnated paper thereby indicating which internal circuits are shorted.

References Cited

UNITED STATES PATENTS

| 2,358,839 | 9/1944 | Wagner | 204—2 |
| 2,642,481 | 6/1953 | Wilson | 324—66 XR |
| 3,310,479 | 3/1967 | Goldstein et al. | 204—2 |
| 3,396,335 | 8/1968 | Burr et al. | 324—51 |

HOWARD S. WILLIAMS, Primary Examiner

G. L. KAPLAN, Assistant Examiner

U.S. Cl. X.R.

324—51, 52